United States Patent

[11] 3,632,119

| | | |
|---|---|---|
| [72] | Inventor | Robert E. Carpenter<br>Nutley, N.J. |
| [21] | Appl. No. | 888,572 |
| [22] | Filed | Dec. 29, 1969 |
| [45] | Patented | Jan. 4, 1972 |
| [73] | Assignee | Chemplast, Inc.<br>Wayne, N.J. |

[54] RESILIENT SEALING MEANS FOR JOINT BETWEEN ELEMENTS HAVING DIFFERENT COEFFICIENTS OF EXPANSION
8 Claims, 14 Drawing Figs.

[52] U.S. Cl. .................................................. 277/26,
277/177, 251/309, 23/292
[51] Int. Cl. ................................................. F16r 5/04,
B01l 3/02
[50] Field of Search ........................................... 277/26,
177; 251/309; 285/423, DIG. 9, DIG. 12, DIG. 20;
23/292

[56] References Cited
UNITED STATES PATENTS

| 3,395,925 | 8/1968 | Dreiding ..................... | 251/309 X |
| 3,372,949 | 3/1968 | McLay ........................ | 285/423 X |
| 3,243,207 | 3/1966 | Carpenter et al. ............ | 285/423 X |
| 3,425,716 | 2/1969 | Blaw ............................ | 285/423 X |
| 3,512,944 | 5/1970 | Craig et al. ................. | 23/292 |
| 2,539,846 | 1/1951 | Lewis et al. ................. | 277/177 UX |

FOREIGN PATENTS

| 1,389,566 | 1/1965 | France ........................ | 285/423 |

*Primary Examiner*—Samuel B. Rothberg
*Attorney*—Popper, Bain, Bobis & Gilfillan ABSTRACT: A resilient static and dynamic sealing assembly for maintaining a fluidtight joint or connection between operatively associated elements where the elements are made of materials having different coefficients of expansion and one element of a relatively stronger material acts to confine the other material in the operative position. The sealing assembly includes on the confined element an elastomeric means which coacts with an annular wall in engagement with the confining element and acts with the annular wall to maintain the seal within conventionally anticipated temperature ranges at least between 32° nd 212° F. The sealing assembly can be provided with means for adjusting the force exerted to form the seal between the operatively associated elements. Further, the sealing assembly will provide an improved laboratory Burette, disposable hypodermic syringes and other devices adapted to utilize the same.

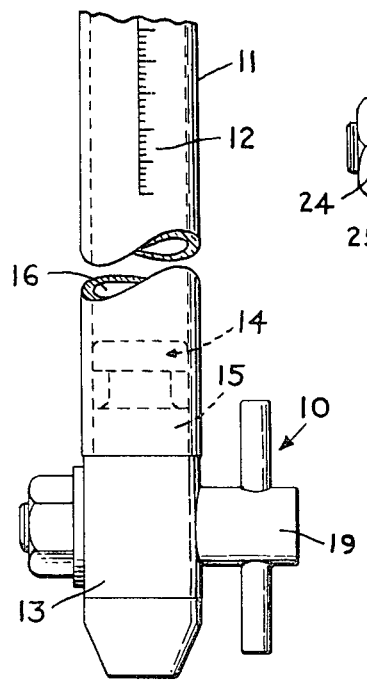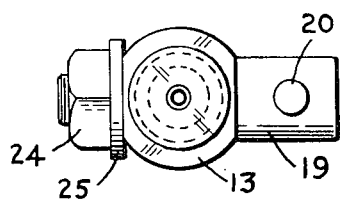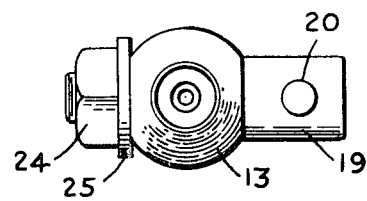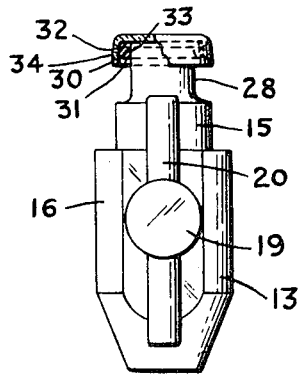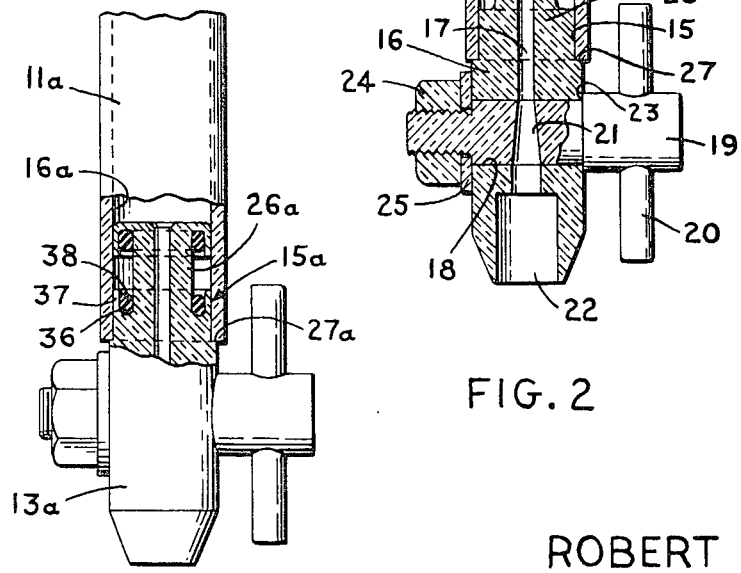
ROBERT E. CARPENTER
INVENTOR.
BY Popper, Bain + Bobis
ATTYS

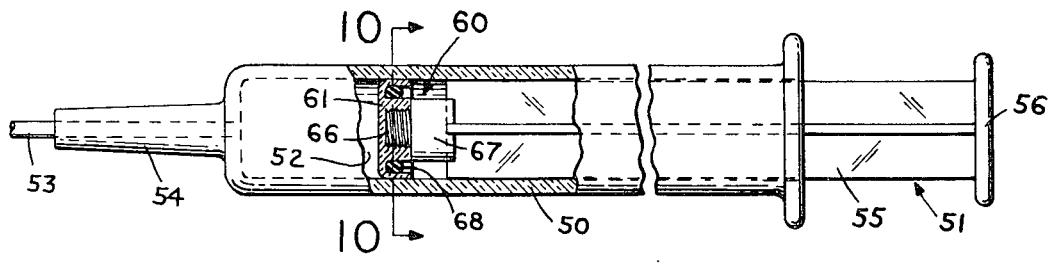
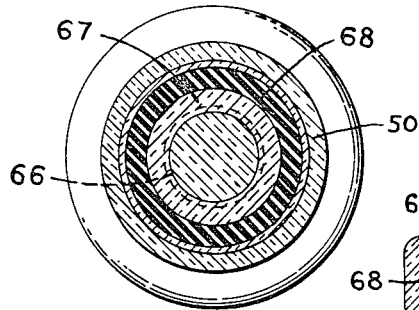
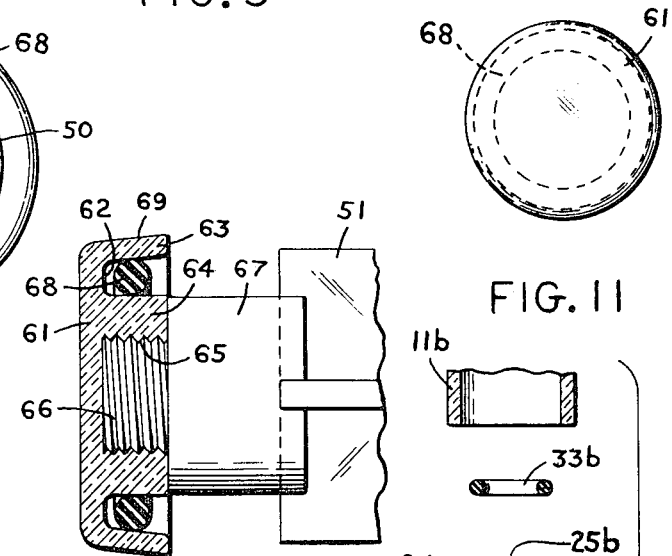
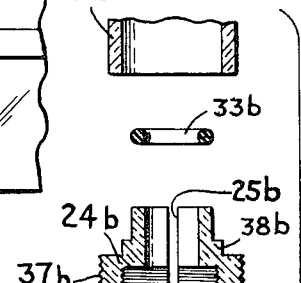
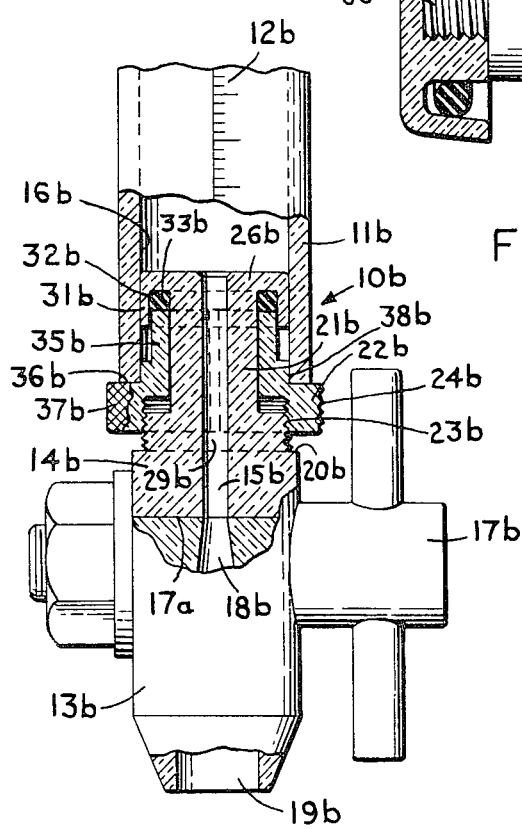
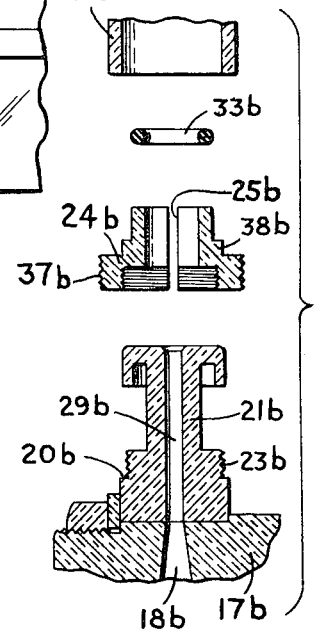
ROBERT E. CARPENTER
INVENTOR.

ROBERT E. CARPENTER
INVENTOR.

BY Popper Bain & Bobis
Attys

RESILIENT SEALING MEANS FOR JOINT BETWEEN ELEMENTS HAVING DIFFERENT COEFFICIENTS OF EXPANSION

BACKGROUND OF INVENTION

In the handling of fluids the obtaining of fluidtight seals or connections often presents a difficult problem.

In many instances, this problem adds to the cost and expense of the device or system in which such fluidtight seal or connection must be maintained because of the nature of the materials that must be used on the device.

To render the sealing problems more complex in certain of these seals or connections it is often important, necessary or desirable, either not to contaminate the fluid being handled or to prevent the fluid from coming in contact with the elements of the seal to avoid erosive, corrosive or destructive effect by the fluid of the critical elements of the seal assembly such as an elastomeric member.

In recent years, it has been found that certain plastic materials such as fluorocarbon resins were particularly adapted for use in place of existing material because they are chemically inert to nearly all conventional fluids handled in industrial and chemical processes, laboratory equipment and systems, medical devices and applications and a variety of other uses.

The use of these materials in the sealing assemblies for devices which now use those materials, however, have presented at least one new and different problem particularly in the case where the fluorocarbon resin or other plastic is used in association with another element which has a substantially different coefficient of expansion and confines the plastic element.

Thus, in a sealing assembly for a joint or connection between two associated elements where one of the elements is made from a plastic such as tetrafluoroethylene; referred to hereinafter as "TFE;" which is confined by another element made for example of a borosilicate glass, such as is sold under the well-known trademark "Pyrex;" the joint is effective and excellent from a chemical standpoint but will fail from a mechanical standpoint because the TFE has a coefficient of expansion which differs from the coefficient of expansion for glass to such an extent as to cause the plastic to be materially and permanently deformed within the range of temperature conditions to which the joint or connection may be normally subjected.

In effect when any such device or connection is raised to an elevated temperature, either during actual use or operation of the device or even inadvertently, the TFE element which is confined by the relatively stronger glass element will be reason of the difference in the coefficients of expansion be deformed to change the interfitting relationship of the TFE element to the glass element sufficient to render the seal assembly for the joint or connection inoperative or nonfunctional.

This can be illustrated for laboratory burettes where efforts were made to use a borosilicate-type glass barrel into which was forced fitted the connecting means formed on an independent control valve or nozzle generally made of a fluorocarbon resin such as TFE. When such burettes are heated or raised to an elevated temperature the connecting means of the plastic nozzle confined in the glass barrel is deformed due to the difference in the respective coefficient of expansion of the plastic nozzle and the glass material of the burette barrel and the relatively greater strength of the glass over that of the plastic material. Thus, when the burette was cooled to room temperature the nozzle and connecting means actually fall out of the glass barrel of the burette.

The reason this occurs can be illustrated for a laboratory burette of the type above described having a barrel with a ½-inch I.D. subjected to a change in temperature from 70° to 100° F., or a 30° temperature change.
Thus:
TFE—Coefficient of Expansion
in the range 70° to 212° F.—$7.0 \times 10^{-5}$=(0.000070) per degree
Borosilicate Glass (Pyrex)—Coefficient of Expansion
in the range 70° to 212° F.—$3 \times 10^{-6}$=(0.000003) per degree
For Borosilicate Glass—½-inch I.D.
a. $0.000003 \times 30 = 9 \times 10^{-5}$ (0.000090)
b. $0.000090 \times 0.5 = 45 \times 10^{-5}$ (0.000045)
For TFE
a. $0.000070 \times 30 = 2.1 \times 10^{-3}$ (0.00210)
b. $0.00210 \times 0.5 = 1 \times 10^{-1}$ (0.001050)

These figures show that TFE expands more than 20 times as much as glass in the same temperature range. Hence, if confined by the relatively stronger glass barrel, as the temperature is elevated it will be permanently deformed that is reduced in diameter and when cooled will remain so deformed.

The present invention contemplates a means for meeting and overcoming not only the problem which occurs where the resilient sealing assembly coacts with elements made of materials with dissimilar coefficients of expansion but also serves to meet the problems of prior art sealing devices with respect to fluidtightness, contamination and corrosive effect above set forth.

The present invention contemplates an improved resilient sealing assembly for elements having different coefficients of expansion where fluidtightness must be maintained over wide variations in temperature.

The improved construction of the resilient sealing assembly of the present invention further accommodates to wide dimensional variations in the element which confines the plastic portion of the resilient sealing assembly and is therefore adapted to eliminate the use of materials and assemblies which rely on precision manufacture of parts and components to the extent that the costs of such items can be reduced to make such items disposable or "throw aways" as will be hereinafter illustrated for disposable hypodermic syringes.

SUMMARY OF INVENTION

The present invention in its simplest form covers a resilient sealing assembly having at least one member made of an inert plastic which coacts with and is confined by, or confined in a bore or cylinder of an associated member or element made of a relatively stronger material having a substantially lesser coefficient of expansion than the inert plastic, said plastic member having an annular wall means of substantially the same plastic material connected adjacent the top or end thereof and spaced from the central portion of the plastic member to permit an elastomeric member to be disposed between said annular wall means and said central portion of the plastic member which elastomeric member is operatively associated with the annular wall means so that in assembled position the outer annulus of the wall means will maintain in the range of temperatures at least between 32° and 212° F. to which the device having the sealing assembly is normally subjected an interference fit with the associated member or element for sealing the joint or connection between these members, for holding these members or for both sealing and holding the members in assembled relation.

Additionally, the present invention contemplates a resilient sealing assembly having means thereon to adjust the interference fit between the operatively associated elements of the sealing assembly.

Additionally, the present invention contemplates the combination of a resilient sealing means and a holding means on said plastic member to provide a connection for holding and aligning the plastic member in assembled position in a bore or cylinder to be sealed.

Additionally, the present invention covers an improved burette means having in combination a tubular glass member having a nonprecision bore therein with an independent nonintegral or detachable control valve having a connecting means to form therewith a resilient sealing assembly in accordance with the present invention which sealing assembly is further adapted to align and hold the control valve in assembled position under all dynamic or static conditions of operation to which the combination may be subjected in an operating range of temperatures at least between 32° and 212° F.

Additionally, the present invention covers an improved disposable hypodermic syringe including a nonprecision barrel and coacting plunger with a piston thereon, having means to form a resilient sealing assembly in accordance with the present invention with said barrel.

These and other objects of the inventions will become apparent from a study of the following specifications taken in connection with the accompanying drawings wherein:

FIG. 1 is a side view of a burette having an independent and detachable control valve in accordance with the present invention.

FIG. 2 is a view of the improved burette shown in FIG. 1 partially in vertical section through the control valve and the lower portion of the nonprecisioned bore.

FIG. 3 is a side elevation of the control valve of the burette shown in FIG. 1 showing the connection means in accordance with the present invention.

FIG. 4 is a top view of the control valve shown in FIG. 3.

FIG. 5 is a bottom view of the control valve shown in FIG. 3.

FIG. 6 shows another form of nozzle having a modified form of sealing assembly and connector.

FIG. 7 shows a further form of the nozzle for a laboratory burette with means to adjust the interference fit.

FIG. 8 shows an exploded view of the form of nozzle shown in FIG. 7.

FIG. 9 is a side view of an improved disposable hypodermic syringe partially broken away to show the plunger therein with a resilient reinformed connecting means in accordance with the present invention in side elevation.

FIG. 10 is a cross section taken on line 10—10 through the piston and the plunger of the disposable hypodermic syringe shown in FIG. 9.

FIG. 11 is an enlarged view of the end of the plunger having the connecting means or joint in accordance with the present invention.

FIG. 12 is an enlarged side elevation of the piston on the plunger shown in FIG. 9 partially broken away in cross section to show the resilient reinformed seal means of the present invention.

IMPROVED BURETTE MEANS

Figure 13:
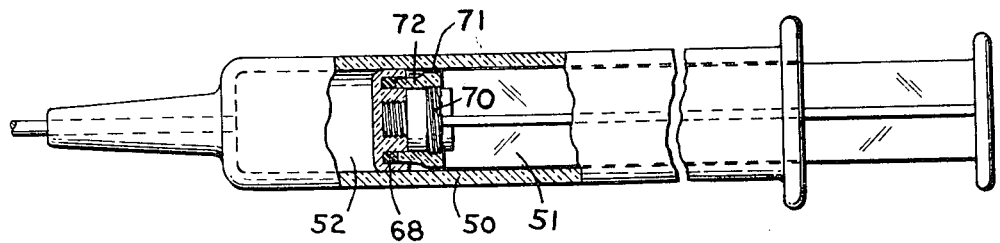
FIG. 13 is an enlarged view of the end of a modified form of the plunger having a sealing assembly in accordance with the present invention with means to adjust the interference fit.

Referring to the drawings FIG. 1 illustrates one form of the present invention as applied to a laboratory device such as a burette generally designated 10.

In conventional burettes the control valve for dispensing fluid from the burette is customarily formed as an integral part of the burette barrel and a manually operated stopcock for the control valve is provided. The valve seat in the control valve and stopcock are ground to provide the necessary close fit for the desired fluidtight conditions required for operation. For this known arrangement not only is the device expensive but if the control valve is damaged it is expensive to repair because of the grinding required to render the control valve operable.

By reason of the advantages of the present invention the burette can, like the earlier efforts of the prior art devices, be made of two separate parts, these parts include the tubular glass barrel 11 with markings 12 thereon graduated to permit accurate dispensing of measured quantities of any given fluid from the burette and a control valve generally designated 13 which is made of TFE or other fluorocarbon resin. However, the control valve 13 illustrated has a resilient sealing assembly 14 in accordance with the present assembly and a holding means 15 which adapts the control valve to be operatively connected into one end of the glass barrel 11 of the burette 10, all of which is shown in FIGS. 1 and 2 of the drawings.

In the present form of the invention standard glass tubing with a nonprecision bore can be used for the barrel of the burette because of the wide dimensional variations that the present seal can tolerate. In glass tubing classified in this manner, the diameter of the inner lumen or inner wall 16 of the glass tubing will be such as to have a tolerance range for the diameter at any particular point along a given tube in a range of $\pm 5 \times 10^{-3}$.

Control valve 13 is preferably molded, fabricated or machined from a piece of plastic material. A fluorocarbon resin such as tetrafluoroethylene is adapted for this purpose because it is chemically inert.

Plastic materials adapted for the above or for the plastic portion of the resilient seal when referred to herein is intended to include at least tetrafluoroethylene; fluoroethylene propylene (FEP); monotrichlorofluoroethylene (KEL-F) vinylidene fluoride (KEYNAR) however, other plastics can be used without departing from the scope of the present invention as will be understood by those skilled in this art.

The stopcock member 19 has a bore 21 therethrough which can be moved so as to align itself with the passage 17 in the valve body. Thus, fluid in the passage 16 can be discharged through the discharge opening 22 in the valve body 16 with which the bore 21 also communicates when is aligned position with passage 17.

The stopcock member 19 is held in position by means of a shoulder 23 and a nut 24 and washer 25.

JOINT OR CONNECTING MEANS FOR BURETTE

The control valve 13 is provided with a resilient sealing assembly 14 in accordance with the present invention which provides a connecting means to adapt the control valve to be fitted into the glass barrel of the burette. This connecting means is located at the end of the control valve remote from the discharge opening 22.

Thus, with reference to FIGS. 2, 3 and 4 of the drawings, it is seen that the control valve has a projection 26 at one end made by molding or machining the end of the control valve 13 to provide a shoulder as at 27 and the annular holding surface 15 adjacent to the shoulder.

The annular surface 15 has a diameter such that it will be adapted to initially form and maintain an interference fit with the nonprecision bore or inner wall 16 of the glass barrel 11 of the burette 10. If the burette is not subjected to unusual temperature changes the annular surface 15 will help maintain the control valve 13 in assembled position. Where wide variations in temperature may occur, an alternate holding member in the form of a second connecting means forming a resilient assembly in accordance with the present invention is provided as is illustrated in the form of the invention shown at FIG. 6 of the drawings to be more fully described hereinafter.

At a spaced distance from the shoulder 27, the projection 26 is shaped or formed as at 28 to provide a caplike member generally designated 29 at the end of the projection 26.

The cap member 29 includes an annular flange or wall member 30 the inner surface 31 of which forms one side of an annular groove 32 which is continuous on the opposite wall with the shaped wall 28. An O-ring 33 of elastomeric material is adapted to be fitted into the groove 32 as is clearly shown in FIGS. 2 and 3 of the drawings.

When the O-ring 33 is initially forced into position as shown in FIG. 3, it is clear that the annular wall member 30 will be prestressed and expanded so that the diameter of the outer surface 34 of the wall member 30 will be greater than that of the annular surface 15.

In assembly the connecting means on the control valve or nozzle 13 is inserted into the bore 16 of the glass barrel 11 and because of the difference in diameter of the outer surface 34 of the annular flange or wall member 30 under the action of the elastomeric O-ring, the diameter of the annular surface 15 the control valve will establish an interference fit 16 with the nonprecision bore. The connecting means serves to fix the control valve or nozzle into assembled position in and to provide a fluidtight seal between the outer surface 34 of the annular flange or wall member 30 and the inner lumen of the glass barrel 11 of the burette 10.

In operation where wide ranges of temperature change do not occur the resilient sealing assembly 14 and the holding surface 15 above described will maintain substantially the same interference fit without difficulty.

Where wide variations in temperature occur, when the control valve 13 is raised to an elevated temperatures then by reason of the different coefficients of expansion between the glass and the confined plastic material and the relatively greater strength of deformation of the glass material as above illustrated, will occur.

While such deformation will adversely affect the interference fit of the holding surface 15, it will not affect the seal between the members because the O- ring which is compressed at the elevated temperatures will expand at the lower temperatures. This action of the O- ring will maintain the interference fit between the outer surface 34 of the annular flange or wall member 30 with the inner lumen or bore 16 of the glass barrel 11.

Thus, by reason of the improved connecting means, a relatively simple control valve or nozzle can be attached into the nonprecision bore of relatively inexpensive glass tubing, thus, providing a means for making a relatively inexpensive burette.

SPACED RESILIENT SEALING ASSEMBLIES

FIG. 6 shows a modified form of connecting means for a fitting or connector which is also adapted to provide a modified form of connecting means for the control valve or nozzle of the improved laboratory burette shown in FIGS. 1 to 5 and described above.

In this modified connecting means the projection 26a on the control valve 13a is shaped or formed with a second groove 36 to provide a second annular flange or wall member 37 adjacent the shoulder 27a. The outer wall 15a of the second annular flange or wall member 37 will be maintained in interference fit with the inner lumen or bore 16a of the barrel 11a by means of a second elastomeric member 38 which is fitted into the second groove 36 in the same manner as above described for the form of the invention illustrated in FIGS. 1 to 5 of the drawings.

In this form of connecting means the control valve or nozzle will operate over a wide range of temperature variations and the spaced resilient sealing assemblies will act to continuously seal, hold and align the control valve or nozzle in the glass barrel of the burette at all times.

RESILIENT SEALING ASSEMBLY WITH MEANS TO ADJUST THE INTERFERENCE FIT

FIGS. 7 and 8 illustrate another form of the present invention in which the resilient sealing assembly is further provided with means to adjust the interference fit between the elements to be sealed.

In the initial formation or under severe deformation of the plastic portion of the seal it may be desirable to readjust the interference fit between the plastic element and the associate element.

FIGS. 7 and 8 illustrate this means as applied to a connecting means on a control valve or nozzle of a laboratory burette of the type above described with respect to FIGS. 1 to 5 of the drawings.

Thus, FIG. 7 which is a fragment of a laboratory burette generally designated 10b shows a glass barrel 11b with measured markings 12b coacting with a control valve or nozzle 13b which is made of the same type plastic above described for the control valve of the form of the invention shown in FIGS. 1 to 5 of the drawings.

Control valve or nozzle 13b consists of an elongated valve member 14b having a longitudinal passage 15b which communicates at one end with the fluid in the barrel 11b. A transverse opening 17a receives a manually operable stopcock 17b which has a passage 18b therein. The passage 18b can be aligned with the longitudinal passage 15b and a discharge outlet 19b to control discharge of fluid from the barrel 11b of the burette 10b.

The end of the control valve remote from the discharge outlet 19b is shaped, formed or machined to provide a shoulder 20b, a projection 21b and a cap member 22b adjacent the shoulder 20b the projection 21b is threaded as at 23b. An annular collar 24b is provided with a slit as at 25b to permit the annular collar 24b to be snapped into position about the projection 21b and threaded weld down on the threaded portion 23b thereon to permit assembly of an elastomeric member as hereinafter described, with which the end of the annular member remote from the threaded end will coact to increase and decrease the interference fit between the connecting means of the plastic control valve and the inner lumen 16b of the glass barrel 11b of the burette 10b, all of which is clearly shown in FIGS. 7 and 8 of the drawings.

It will be understood by those skilled in the art that for assembly purposes the annular collar 24b could be made in two mating halves which are joined by a threaded member through the flange portion 26b of the annular collar.

The cap member 22b is made of substantially the same plastic material as the control valve or nozzle 10b. It has a passage 29b which is in alignment in assembled position with the longitudinal passage 15b in the elongated valve member 14b. The end portion 35b of the cap member 22b has an annular flange or wall member 21b extending downwardly or inwardly about the projection 21b a spaced distance from the outer surface or wall thereof to form an annular groove 32b. An 0- type elastomeric member 33b fits into the groove 32b and forces the annular flange or wall member 31b outwardly identical to the manner illustrated for the annular flange or wall member 30 shown in FIG. 3 of the drawings.

Thus, when the control valve or nozzle 13b is assembled the annular flange or wall member 31b will form an interference fit with the inner lumen or bore 16b of the glass barrel 11b of the burette.

Annular collar 24b has a tubelike annular projection 35b which is disposed about the projection 21b and in assembled position can be threaded into engagement with the elastomeric member 33b. The flange 26b of the annular collar 24b is provided with shoulder 36b which abuts the end of the glass barrel 11b. A knurled portion 37b adjacent one side of the shoulder as shown in FIG. 7 extends outwardly so that it can be manually adjusted to thread the annular collar 35b into and out of enjoyment with the elastomeric member 32b.

The annular outer wall means 38b of the annular collar 23b which will be inside the barrel 11b has a diameter such that it also at least initially forms a light interference fit with the inner bore 16b of the glass barrel 11b and the annular projection 35b extends from this annular outer wall means 38b into engagement with the elastomeric member 33b.

In operation when greater interference fit is required then after the elements of the burette are in assembled position the knurled portion 37b of the annular collar 24b is turned to thread the annular collar inwardly to bring the end of the annular projection 35b into engagement with the elastomeric member 33b. This will exert a compressing force on the elastomeric member 33b which is transmitted to the annular flange or wall member 31b to increase the interference fit. If a lesser interference fit is desired then the annular collar 35b is threaded outwardly to reduce the force acting on the elastomeric member 33b which in turn reduces the force acting on the annular flange or wall member 31b.

DISPOSABLE HYPODERMIC SYRINGE

Referring now to drawings FIGS. 9, 10, 11 and 12 where another application of a resilient sealing assembly in accordance with the present invention is illustrated as applied to a disposable hypodermic syringe.

Thus, referring to FIG. 9 the hypodermic syringe shown includes a barrel 50 having a nonprecision bore. The barrel has a transverse wall at one end and the end remote therefrom is open to receive a plunger 51 which is slidably mounted in and forms with the barrel 50 a chamber as a 52 between the plunger and the transverse wall of the barrel. The chamber 52 is adapted to receive fluid through a conventional hollow needle member 53 which is mounted in the projection 54 connected to the transverse wall of the barrel 50 so that one end of the needle communicates with the chamber 52 in the manner which is well known in this art.

The plunger 51 conventionally is manually operated for movement into and out of the chamber 52 and comprises an elongated generally X-shaped body member 55 having an end button 56 which is disposed on the end of the body member of the plunger 51 disposed externally of the barrel 50.

RESILIENT SEALING ASSEMBLY FOR THE PISTON

At the end remote from the button 56 a resilient sealing assembly generally designated 60 is formed in accordance with the present invention.

Thus, the end of the plunger is formed with a cap member 61 which is made of any suitable type of inert plastic material such as a fluorocarbon resin for example, tetrafluoralethylene.

In FIG. 12 of the drawings, one portion of the resilient sealing assembly 60 is shown in its enlarged new preassembled position. The cap 61 is indicated clearly as including a grooved or undercut portion as at 62 which forms an annular wall as at 63 about the inner support section 64 of the cap member 61. The inner support section in the illustrated form of the invention is threaded as at 65 to facilitate mounting the cap member on the threaded elements 66 of the plunger extension 67 although it will be understood that the piston could be formed as an integral part of the plunger and that other forms of connecting means could be provided without departing from the scope of the present invention.

The annular wall means 63 is of thickness which provides the wall with resilient characteristics but resists permeation by the fluids or the liquids being sealed.

When an elastomeric member 68 is fitted into the groove means 62 it will deform the annular wall means 63 outwardly.

The extent of this deformation will be such that the outer surface 69 of the annular wall means 63 will in the preassembled condition always have a diameter greater than the diameter of the chamber means 52 in the barrel 50 of the hypodermic syringe. Therefore, when the plunger is thrust into the chamber 52 the annular wall must of necessity be reduced radially. This will act to compress the elastomeric member 67 and maintain the elastomeric member under compression so that a snug interference fit is established between the outer surface 68 of the annular wall 63 and the inner wall of the chamber 52.

However, because of the resilient character of the annular wall 63 in association with the elastomeric member 67, the inner wall of the chamber 52 does not have to be precisely formed and need not conform with the precision bores now required in many prior art hypodermic syringes which made them expensive devices which must be constructed of materials which permit their reuse.

Further, because of the inert character of the cap member 61 and because the elastomeric member 67 is disposed in the groove 62 remote from the fluid contained in the chamber 52 a noncontaminating sealing means or assembly is provided which is continually reinforced because the elastomeric member 67 in assembled position is under a constant condition of compression and thus continues to act to maintain the seal between the annular wall 63 and the inner wall of the chamber 52 of the syringe at all times.

It is believed obvious that the expensive prior art techniques regarding precision glass bores and plungers for hypodermic syringes can always be used to meet the sealing problems as was known to the prior art.

However, the improved resilient sealing assembly of the present invention provides means for creating a simple, less costly "throw away" disposable hypodermic syringe made of an inert plastic as has been above described which opens new vistas for the handling and the dispensing of medication and other injectable substances.

MODIFIED SEALING ASSEMBLED WITH MEANS TO ADJUST INTERFERENCE FIT

It is believed fundamental that the extent of the interference fit between the outer surface 68 of the annular wall 63 and the inner wall of the chamber 52 can be regulated as a function of the degree of compression of the member 67.

Figure 14:
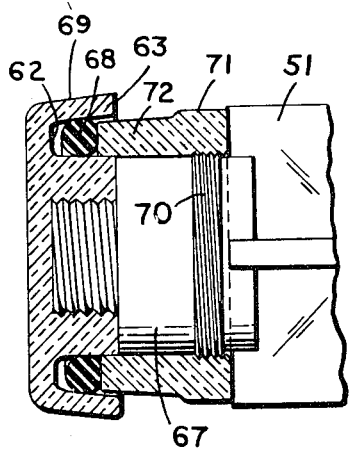
FIG. 14 is an enlarged view of the elements forming the modified form of the plunger shown in FIG. 13 of the invention.

FIGS. 13 and 14 illustrate a modification of the resilient sealing assembly to provide means for exerting this force so as to increase the interference fit between the annular wall 63 and the coacting inner wall of the chamber 52.

In this arrangement the plunger 51 is modified to provide a threaded portion as at 70 which is adapted to receive a collar member 71.

Collar member 71 has an annular projection 72 which extends axially about the plunger extension 67 and into the groove or undercut portion 62.

In this arrangement the annular collar member 71 can be moved into engagement with the elastomeric member 68 to increase the force exerted by the elastomeric member against the annular wall means 63 which in turn in assembled position increases the interference fit between the outer surfact 69 of the annular wall means 63 and the inner wall of the chamber 52.

As an alternate to the above, the annular collar member 71 can be formed integral with the plunger extension 67 and the cap 61 could be threaded in and out on the projection 72 and then locked in the desired position by any suitable means as will be understood by those skilled in this art.

Thus, a relatively simple sealing assembly has been described for operatively associated elements which have respectively different coefficients of expansion, which sealing assembly provides two basic advantages. First, it maintains a fluidtight seal over a wide variation in temperatures. Second, it accommodates wide dimensional variation in the confining element operatively associated with the confined element of any device in which the resilient sealing assembly is used.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

What is claimed is:

1. A resilient sealing assembly comprising:
   a. an outer element having an opening to be sealed;
   b. an inner element made of an inert plastic of lesser strength than the material of said outer element but having a greater coefficient of expansion;
   c. said inner element having an elongated central portion;
   d. means forming a sealing assembly operatively associated with said central portion said sealing assembly including;
      1. annular means having an inner wall and an outer wall;
      2. said annular means disposed about said central portion and in spaced relation thereto;
      3. and means connecting at least one end of said annular means to said central portion to form a recess between the central portion and the inner wall of said annular wall means; and
   e. said elongated central portion and its associated sealing assembly in assembled position confined by the wall of said opening;
   f. and an elastomeric member thicker in cross section than the width of said recess and mounted to engage and to stress the inner wall of said annular means so that the compressive forces transmitted will continuously maintain the outer wall of the annular means in interference fit with the wall of the opening in said outer element to maintain a continuous seal between the inner and outer elements.

2. In a resilient sealing assembly as claimed in claim 1 wherein the inert plastic is a fluorocarbon resin.

3. In a resilient sealing assembly as claimed in claim 1 wherein:
   a. a connecting means is formed on said elongated central portion of said member a spaced distance from the means forming said sealing assembly;
   b. said connecting means having a diameter such that it will form a force fit with the wall of the opening in said element at least on initial assembly of the member with said element.

4. In a resilient sealing assembly as claimed in claim 1, wherein:
   a second sealing assembly is formed on said elongated central portion of said member a spaced distance from the means forming the first sealing assembly and on the side remote from the opening sealed by said first sealing assembly.

5. In a resilient sealing assembly as claimed in claim 4 wherein the second sealing assembly includes:
   a. second annular means having an inner wall and an outer wall;
   b. said second annular means disposed about said central portion and in spaced relation thereto,
   c. means connecting at least one end of said second annular means to said central portion to form a second recess therewith;
   d. and a second elastomeric member thicker in cross section than the width of the recess and mounted to stress the inner wall of the second annular means so that the compressive forces transmitted will continuously maintain the outer wall of the annular means in interference fit with the wall of the opening in said outer element and will coact with the first-mentioned sealing assembly to hold the inner element in assembled position in said outer element and to maintain a continuous seal therebetween.

6. A fitting having means to detachably connect the same into the nonprecision bore of a tubular element comprising:
   a. a member made of inert plastic material having less strength but a greater coefficient of expansion than the material of which the tubular element is made;
   b. said means forming the detachable connection adjacent at least one end of the member, said detachable connection means including:
      1. an elongated central position;
      2. an annular means having an inner wall and an outer wall and connected at one end to said central portion of the members;
      3. said inner wall of the annular means having a greater diameter than the outer wall of the central portion to form a recess between the central portion and the annular means;
      4. and an elastomeric member thicker in cross section than the width of the recess and mounted thereon to exert forces to expand the annular means so as to provide the interference fit necessary to hold the fitting in the nonprecision tubular bore and to provide a seal therewith.
   c. a connecting means formed on said member in spaced relation to the detachable connection means;
   d. and said connecting means having a diameter to provide force fit engagement with the wall of the nonprecision bore when the fitting is initially connected into said tubular element.

7. In a fitting as claimed in claim 6 wherein the annular means has a thickness to permit limited resiliency but not to permit permeability of fluid.

8. In a fitting as claimed in claim 6 wherein the inert plastic is a fluorocarbon resin.

* * * * *